United States Patent [19]

Hidano

[11] Patent Number: 5,584,583
[45] Date of Patent: Dec. 17, 1996

[54] ROLLER AND CAGE ASSEMBLY

[75] Inventor: Kengo Hidano, Kanagawa, Japan

[73] Assignee: Nippon Thompson Co., Ltd., Tokyo, Japan

[21] Appl. No.: 352,592

[22] Filed: Dec. 9, 1994

[30] Foreign Application Priority Data

Dec. 15, 1993 [JP] Japan .................................. 5-343119

[51] Int. Cl.⁶ ............................................ F16C 33/46
[52] U.S. Cl. .................................... 384/470; 384/589
[58] Field of Search .................................. 384/470, 580, 384/576, 578, 575

[56] References Cited

U.S. PATENT DOCUMENTS

| | | | |
|---|---|---|---|
| 3,494,684 | 2/1970 | Benson | 384/580 |
| 3,582,165 | 6/1971 | Koch | 384/580 |
| 5,033,878 | 7/1991 | Tsuji et al. | 384/580 |

FOREIGN PATENT DOCUMENTS 52-124353  3/1951  Japan .

1299317  12/1989  Japan .

Primary Examiner—Lenard A. Footland
Attorney, Agent, or Firm—Sughrue, Mion, Zinn, Macpeak & Seas

[57] ABSTRACT

A roller and cage assembly is able to accept large loads due to the high rigidity of the cage, while having an excellent lubrication property that enables it to demonstrate favorable high-speed rotation performance even under conditions of low levels of lubrication, thus giving it a high level of universal applicability. The rigidity of the cage is increased by providing thick-walled portions on each column of the cage. Together with being formed on a straight line, these thick-walled portions provide reinforcing action at prescribed locations. In addition, these thick-walled portions also function as guide portions that guide the rollers. These thick-walled portions are arranged so as to correspond to the center slit formed in the big end of a connecting rod for supplying lubricant, thereby enabling them to achieve improved lubrication performance.

7 Claims, 13 Drawing Sheets

ROLLER AND CAGE ASSEMBLY

BACKGROUND OF THE INVENTION

1. Field of the Invention

The present invention relates to a roller and cage assembly.

2. Description of the Prior Art

Roller and cage assemblies that took advantage of characteristics such as having a small cross-sectional height, large load capacity and favorable high-speed rotation performance were frequently used in the past for the connecting rods of engines installed on motorcycles and so forth.

FIGS. 1 through 4 show an example of a roller and cage assembly of the prior art. Furthermore, this roller and cage assembly is disclosed in Japanese Utility Model Laid-Open Publication No. 52-124353.

As shown in the drawings, this roller and cage assembly is composed of a roughly cylindrically shaped cage 1, in which a plurality of pockets 1a are formed at equal intervals in the circumferential direction, and rollers 2 (not shown in FIG. 2), which have a larger diameter than the wall thickness of said cage 1 and are inserted into each of said pockets 1a. Cage 1 has two rings 1b, one on either end, and a plurality of thin-walled columns 1c (or bars 1c in the nomenclature of International Standard Organization ISO5593), which are integrated into a single structure with both said rings 1b and are arranged in the circumferential direction to as to demarcate the above-mentioned pockets 1a together with said rings 1b. The end surfaces of both sides in the circumferential direction of each of said columns 1c serve as roller guide surfaces 1d. In addition, inner retaining projections 1e and outer retaining projections 1f are respectively formed on both sides in the circumferential direction at the center and both ends of each of said columns 1c. These inner retaining projections 1e and outer retaining projections 1f prevent roller 2 from falling out to the inside and outside.

As is clear from FIGS. 1 through 3, the central portion of each of the above-mentioned columns 1c is bent to the inside so that it forms the letter "M" together with the cross-sectional shape of rings 1b of both ends. This roller and cage assembly is therefore referred to as an M-shaped roller and cage assembly.

In the roller and cage assembly having this constitution, since columns 1c are thin-walled and bent considerably, the rigidity of cage 1 is limited. This cage is frequently selected in the case of being subjected to relatively weak loads. On the other hand, with respect to lubrication, since this roller and cage assembly is able to adequately take in lubricant by taking advantage of its largely opened M-shaped cross-section, lubrication is performed extremely efficiently. Consequently, even if the amount of lubricant supplied is low, the roller and cage assembly is able to continue to rotate at high speeds for a long time.

FIGS. 5 through 7 indicate another example of a roller and cage assembly of the prior art. Furthermore, this roller and cage assembly is disclosed in Japanese Patent Laid-Open Publication No. 1-299317. In addition, since this roller and cage assembly is composed in the same manner as the roller and cage assembly shown in FIGS. 1 through 4 with the exception of those portions explained below, an explanation of the entire roller and cage assembly is omitted. Instead, only the essential portion will be explained. In addition, in the following explanation, the same reference numerals will be used for those constituents identical or corresponding to the constituents of the roller and cage assembly shown in FIGS. 1 through 4.

In this roller and cage assembly, each of columns 1g, which demarcate pockets 1a together with rings 1b on both ends, is composed in the following manner.

Namely, column 1g has guide portions 1h, respectively continuous with both rings 1b and formed to be thick-walled from the outside to the inside of the pitch circle diameter (P.C.D.) of roller 2, and thin-walled portion 1i interpositioned between said guide portions 1h, and are formed so that the outer surface is roughly consistent with the outer peripheral surface of ring 1b over its entire length. Roller guide surface 1j (see FIG. 7) is formed on both sides in the circumferential direction of both said guide portions 1h. In addition, inner retaining projections 1k are formed on both sides in the circumferential direction of the inner surface of said both guide portions 1h, and outer retaining projections 1m are formed on both sides in the circumferential direction of thin-walled portion 1i. Roller 2 is retained by these projections, and is prevented from falling out of pocket 1a.

As is clear from FIGS. 5 and 6, each of the above-mentioned columns 1g is formed into the shape of a gateway together with the cross-sectional shape of both rings 1b. As a result, this roller and cage assembly is referred to as a gateway-shaped roller and cage assembly.

Since this roller and cage assembly has a cross-section in the shape of a gateway as described above, it has large rigidity. In addition, since the width dimension of columns 1g along the P.C.D. of roller 2 is smaller than the M-shaped roller and cage assembly previously described, the number of rollers 2 incorporated can be increased. As a result of having these characteristics, this roller and cage assembly is selected when a high load capacity is required. However, this roller and cage assembly has the following problems with respect to lubrication.

Namely, as shown in FIG. 8, the state in which this roller and cage assembly is equipped on the big end 6a of a connecting rod 6 is considered. At this time, the supply of lubricant (oil) to said roller and cage assembly is performed through weights 7a of crankshaft 7, side slits 8 between cage 1, and center slit 6b formed in the center in the axial direction of big end 6a. Center slit 6b, however, is expected to supply the largest amount of lubricant. However, in said roller and cage assembly, guide portions 1h (see FIG. 6), in which roller guide surfaces 1j (see FIG. 7) are formed, are located on both end surfaces of cage 1, and are greatly removed from center slit 6b. Thus, a large amount of lubricant must be supplied to prevent seizure during high-speed rotation.

In addition, in said roller and cage assembly, the end surfaces of cage 1 and corresponding end surfaces of big end 6a generate wear as indicated with the double dot broken line as shown in FIG. 9 following high-speed rotation testing. Since thick-walled guide portions 1h are provided on said end surfaces as described above, mass ends up becoming imbalanced. Thus, the above-mentioned wear is the result of this end surface portion, in which the distribution of mass is large, making strong contact with big end 6a. Namely, since the pV value becomes locally high, in order to obtain favorable high-speed rotation performance, the amount of lubricant supplied must be increased with respect to this point as well.

SUMMARY OF THE INVENTION

As has been described above, each type of roller and cage assembly of the prior art is recognized to be particularly superior with respect to either lubrication or rigidity depending on the shape of the cross-section of the rollers equipped in each of said assemblies, and is suitably selected according to the conditions of use. Conversely, M-shaped roller and cage assemblies having superior lubrication are inferior in terms of rigidity. In contrast, gateway-shaped roller and cage assemblies having large rigidity leave room for improvement with respect to lubrication. Since there are many cases when designing engines and so forth when design conditions must be compromised due to each of these shortcomings, a resolution to this problem is desired.

In consideration of the above-mentioned problems, the object of the present invention is to provide a roller and cage assembly that, together with having high rigidity enabling it to accept large loads, also has excellent lubrication properties enabling it to demonstrate favorable high-speed rotation performance even during low levels of lubrication, thus resulting in a high degree of universal applicability.

The roller and cage assembly according to the present invention is composed of a roughly cylindrical cage, having rings on both ends and a plurality of columns arranged in the circumferential direction integrated into a single structure with each of said rings which demarcate pockets together with said rings; and, rollers having a diameter larger than the wall thickness of said cage which are inserted into each of said pockets; wherein, each of said columns is formed so that the outer surface is rougly consistent with the outer peripheral surface of said rings over its roughly entire length, and guide portions, in which roller guide surfaces are formed on both sides in the circumferential direction, are provided having thickness from the outside to the inside of the pitch circle diameter of said rollers in the center or its vicinity in the axial direction of said columns.

DESCRIPTION OF THE PREFERRED EMBODIMENTS

Figure 1:
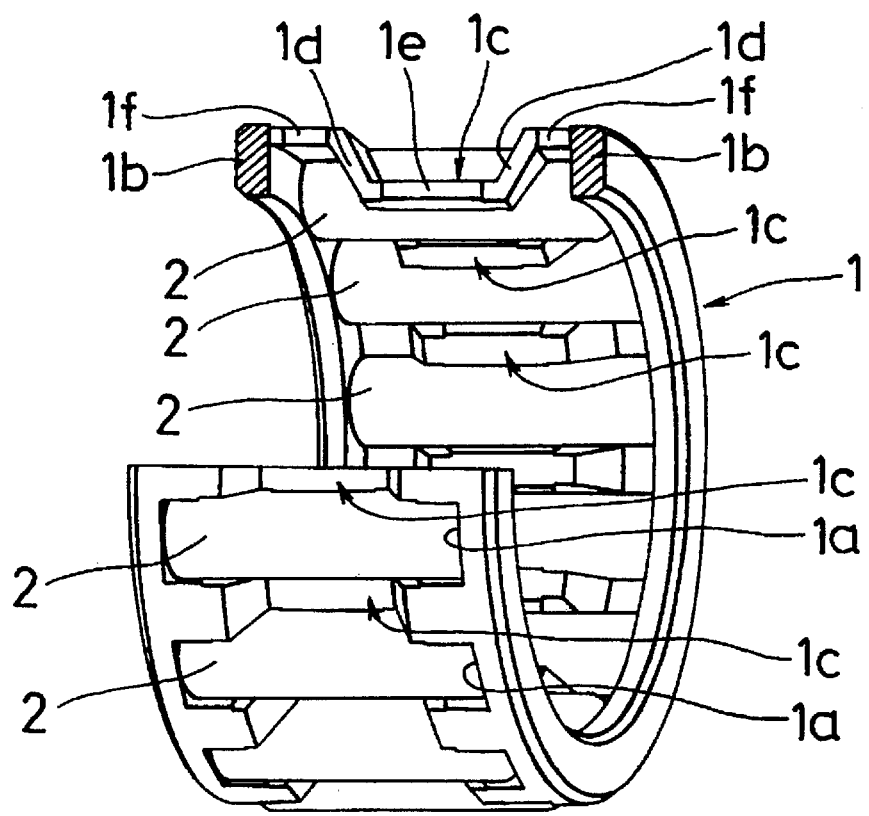
FIG. 1 is a perspective view, including a partial cross-section, of an example of a roller and cage assembly of the prior art.
Figure 2:
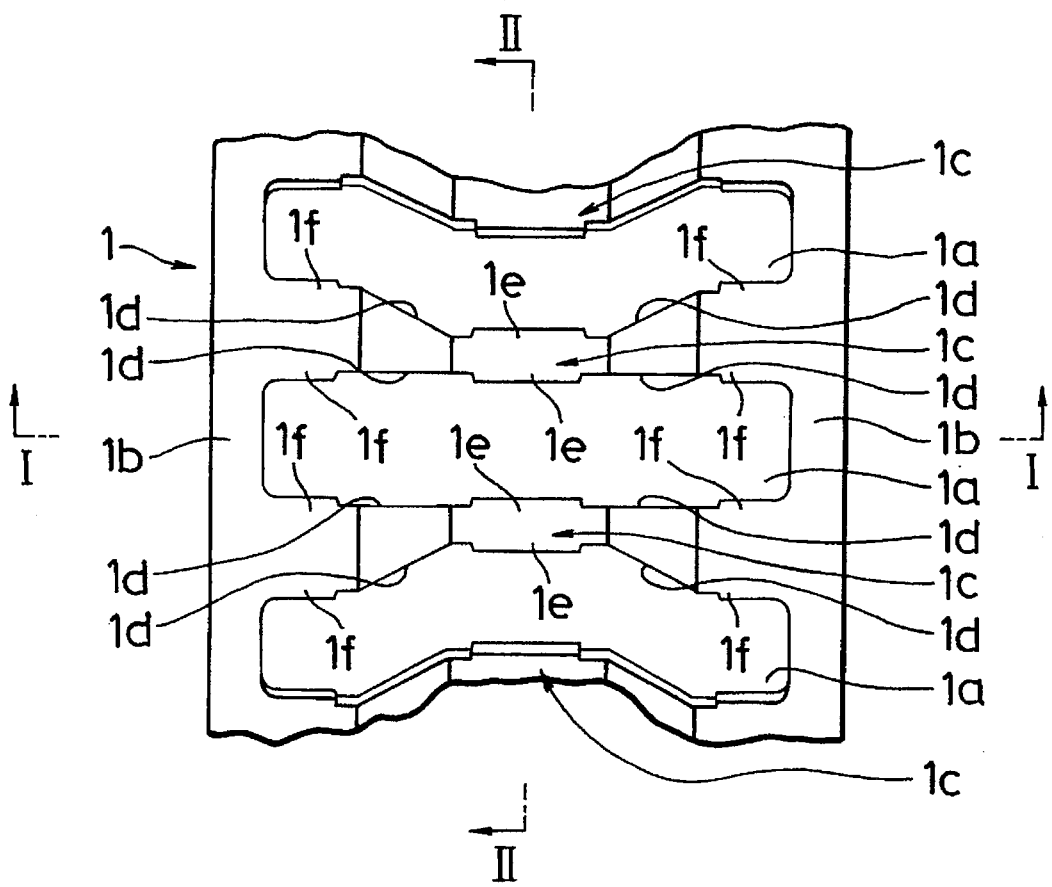
FIG. 2 is an overhead view of a portion of the roller and cage assembly shown in FIG. 1.
Figure 3:
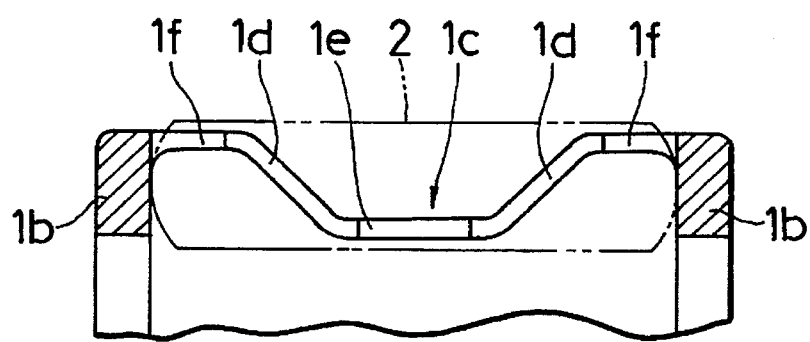
FIG. 3 is a view taken along arrows I—I relating to FIG. 2.
Figure 4:
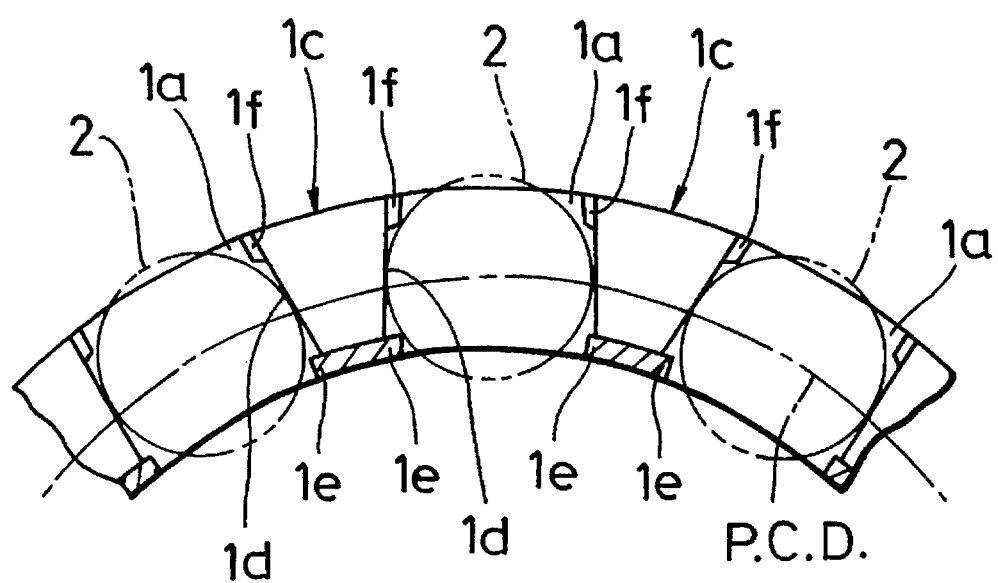
FIG. 4 is a view taken along arrows II—II relating to FIG. 2.
Figure 5:
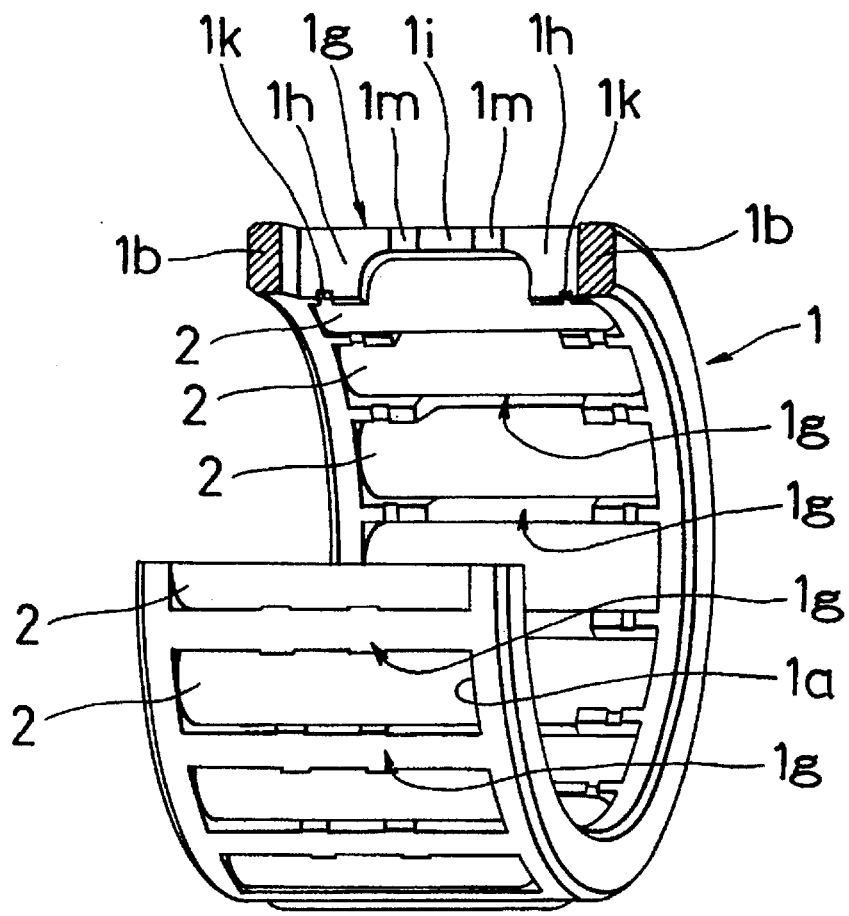
FIG. 5 is a perspective view, including a partial cross-section, of another example of a roller and cage assembly of the prior art.
Figure 6:
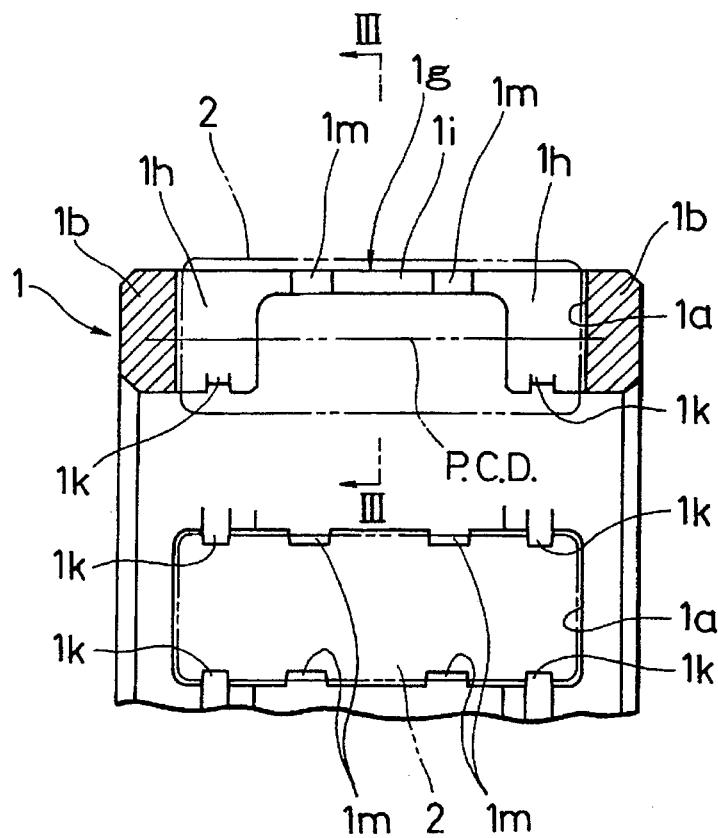
FIG. 6 is a longitudinal cross-sectional view of a portion of the roller and cage assembly shown in FIG. 5.
Figure 7:
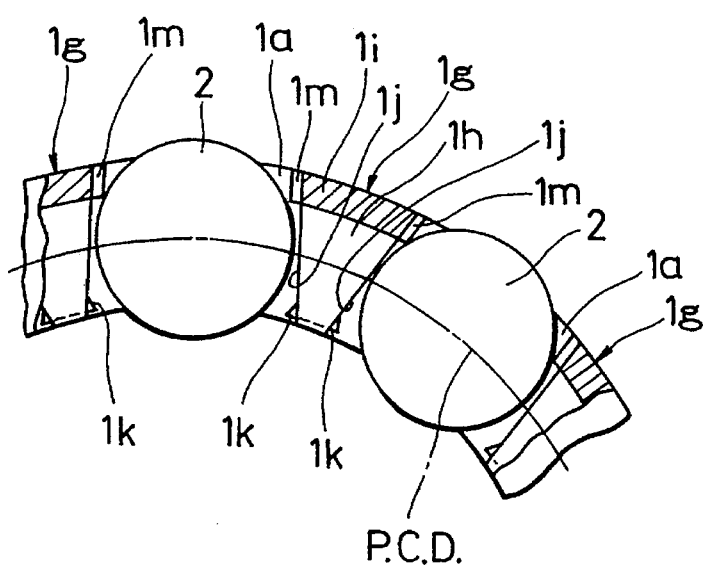
FIG. 7 is a view taken along arrows III—III relating to FIG. 6.

The following provides an explanation of the embodiments of the present invention with reference to the attached drawings.

FIGS. 10 through 14 indicate a roller and cage assembly as a first embodiment of the present invention.

As shown in the drawings, said roller and cage assembly is composed of cage 11, roughly in the shape of a cylinder, in which a plurality of pockets 11a are formed at equal intervals in the circumferential direction, and needle-shaped rollers 12 inserted into each of said pockets 11a. Furthermore, the width dimension of each pocket 11a is slightly larger than the outer diameter dimension of roller 12 excluding the dimension between each of the retaining projections to be described later. In addition, the diameter of each roller 12 is larger than the thickness of cage 11.

Cage 11 is formed into a single structure with two rings 11b one on either end and a plurality of columns 11c, which mutually join both said rings 11b and are arranged in the circumferential direction so as to demarcate each of said pockets 11a together with each of said rings 11b. These columns 11c are formed so that their outer surfaces are consistent with the peripheral surface of both rings 11b substantially over their entire length. Columns 11c have thin-walled portions 11d on both ends that are respectively continuous with both rings 11b, a pair of thick-walled portions 11e arranged so as to sandwich said thin-walled portions 11d with said rings 11b, and another thin-walled portion 11f interpositioned between said thick-walled portions 11e.

Figure 10:
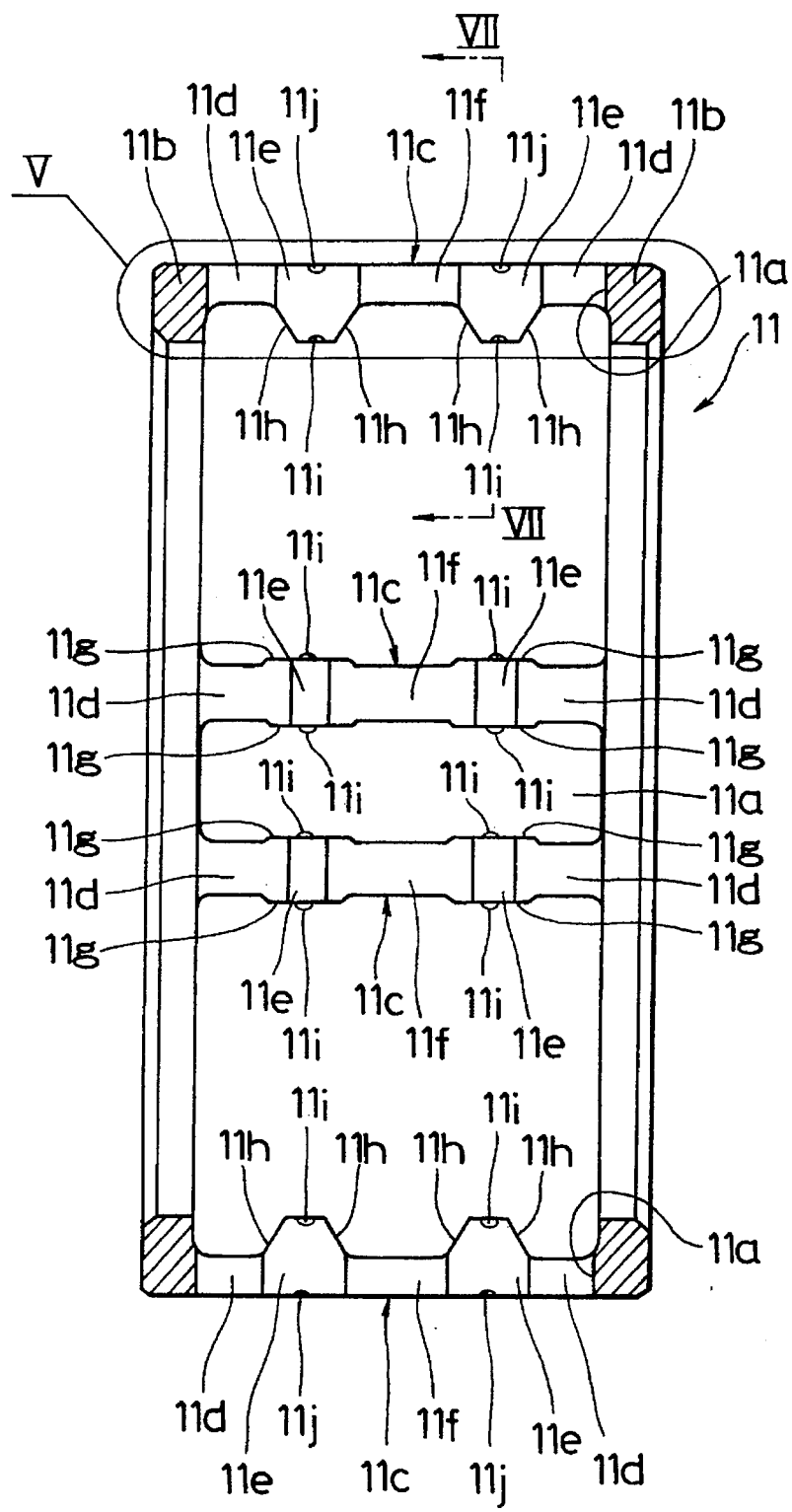
FIG. 10 is a longitudinal cross-sectional view of a roller and cage assembly as a first embodiment of the present invention.
Figure 11:
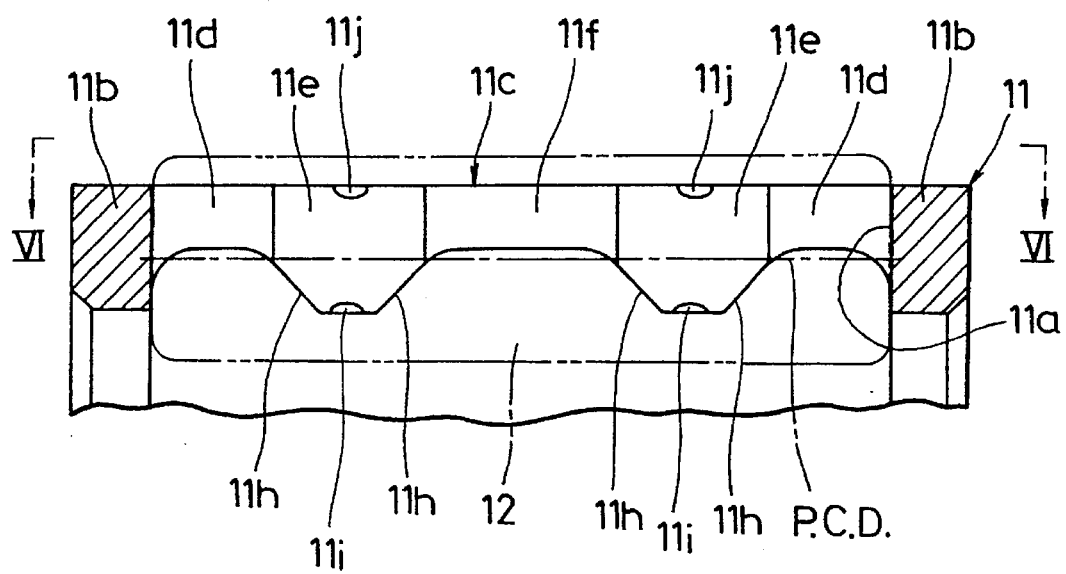
FIG. 11 is an enlarged view of portion V in FIG. 10.
Figure 12:
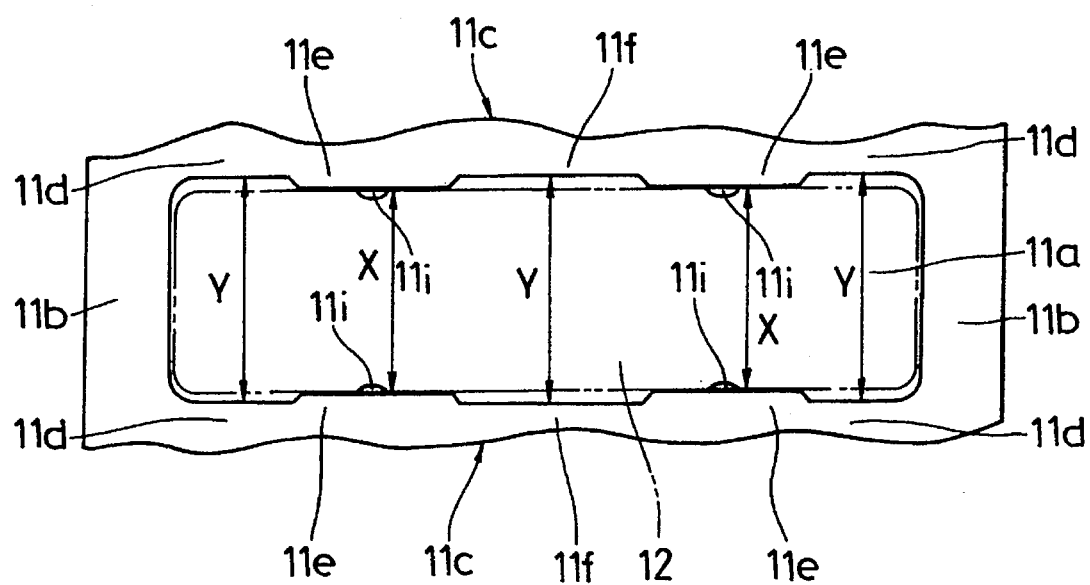
FIG. 12 is a view taken along arrows VI—VI relating to FIG. 11.
Figure 13:
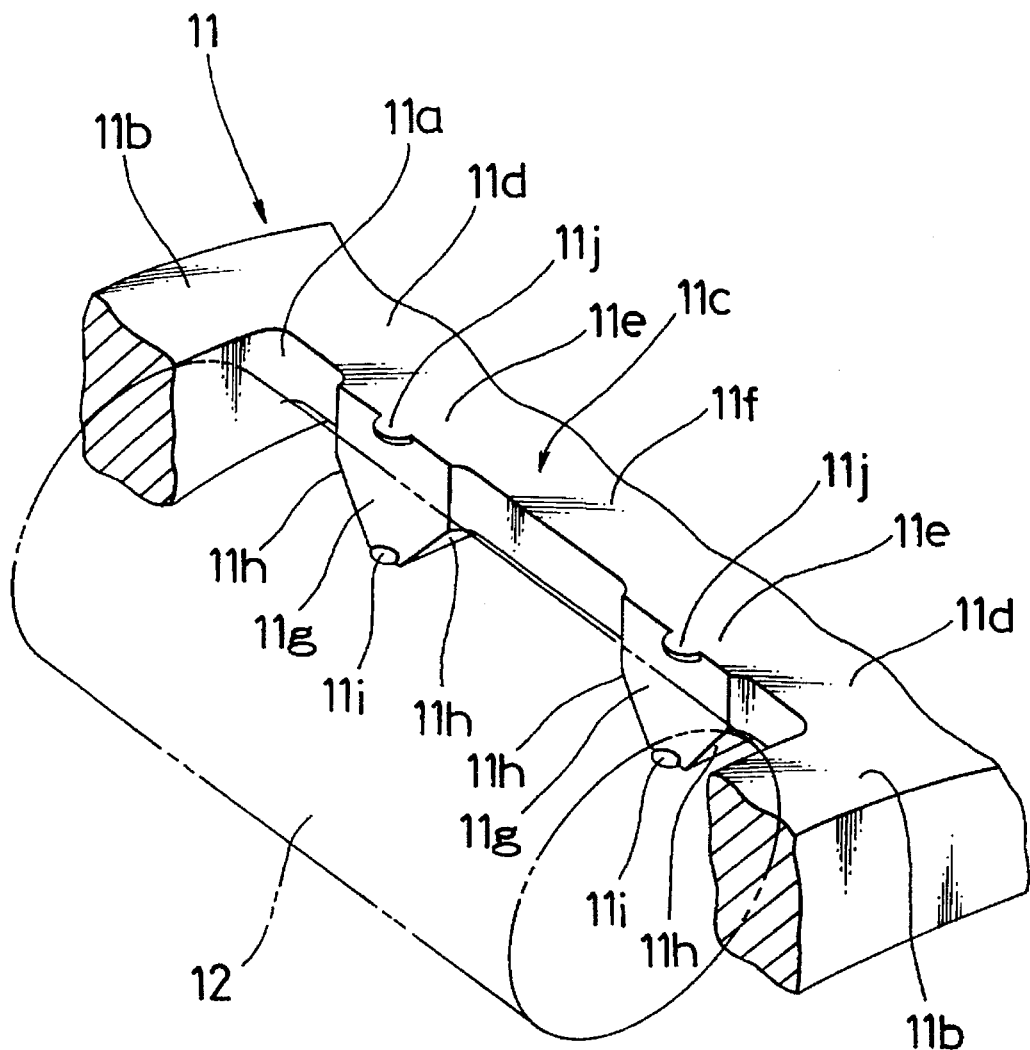
FIG. 13 is a perspective view of the constitution shown in FIG. 11.

Thick-walled portions 11e, provided at two locations near the center in the axial direction of each column 11c as described above, act as guide portions that guide roller 12. Flat roller guide surfaces 11g are formed protruding farther on both sides in its circumferential direction than the above-mentioned thin-walled portions 11d and 11f. Thus, thick-walled portions 11e guide roller 12 by smoothly making contact with said roller 12 at said roller guide surfaces 11g. As is clear from FIGS. 11 through 14, these thick-walled portions 11e are provided from the outside to the inside over the pitch circle diameter (P.C.D.) of rollers 12. In addition, as is shown in FIGS. 10, 11 and 13, both sides in the axial direction of said thick-walled portions 11e at locations that protrude farther than thin-walled portions 11d and 11f on both sides form tapered surfaces 11h, and these projecting locations have a roughly trapezoidal shape.

The above-mentioned columns 11c are provided with thick-walled portions 11e both in a straight line and at prescribed locations. As a result of these thick-walled portions 11e demonstrating reinforcing action, a relatively large section modulus is secured over its entire length. As a result, the rigidity of the entire cage is large. In addition, since the width dimension of said columns 11c over the pitch circle diameter (P.C.D.) of rollers 12 is suppressed, the number of rollers 12 that are incorporated can be increased, thus resulting in the obtaining of a high load capacity.

Moreover, said roller and cage assembly also has an excellent lubrication characteristic. Namely, the state is assumed (not shown in the drawings) wherein said roller and cage assembly is installed on big end 6a of connecting rod 6 shown in FIG. 8. In this state, supply of lubricant (oil) to the roller and cage assembly is performed through side slits 8, located between weights 7a of crankshaft 7 and said cage, and center slit 6b formed in the center in the axial direction of big end 6a. Center slit 6b in each of these slits, however, is expected to supply the largest amount of lubricant. As described above, in the roller and cage assembly, thick-walled portions 11e, acting as guide portions in which roller guide surfaces 11g are formed, are arranged near the center in the axial direction of columns 11c so as to correspond with center slit 6b. Consequently, lubricant can continuously be adequately and efficiently supplied to said roller guide surfaces 11g and rollers 12 that make sliding contact with them. In addition, as a result of employing the above-mentioned constitution for columns 11c, there is no generation of imbalance in the mass in the axial direction, thus equalizing the mass of the entire cage 11. As a result, contact pressure with the above-mentioned big end 6a is relieved, and local pV value decreases. Based on these characteristics, generation of heat and so forth is suppressed even under conditions of low levels of lubrication, and favorable high-speed rotation performance can be demonstrated.

However, although the above-mentioned thick-walled portions 11e are provided symmetrically at two locations with respect to the center in the axial direction of columns 11c, according to this constitution, rollers 12 are able to be guided with stability. In addition, thick-walled portions 11e may also be provided at three locations or only in one location. However, in the case of providing thick-walled portions 11e at three or more locations, it is preferable to arrange said thick-walled portions 11e so as to be concentrated near the center in the axial direction of columns 11c so as to correspond with said center slit 6b to facilitate adequate supply of lubricant from the center slit 6b of the above-mentioned big end 6a. In addition, in the case of providing said thick-walled portion 11e only at one location, although it may be arranged, for example, in the center in the axial direction of columns 11c, at that time, it is preferable to make the length of said thick-walled portion in the axial direction relatively large so that rollers 12 are guided with stability.

Furthermore, a pair of inner retaining projections 11i are formed on the inside of each of the above-mentioned thick-walled portions 11e, and a pair of outer retaining projections 11j are formed at locations corresponding to said inner retaining projections 11i on the outside. These inner retaining projections 11i and outer retaining projections 11j protrude so as to face pocket 11a, and the interval between said retaining projections of adjacent columns 11c in the circumferential direction is set to be slightly smaller than the diameter of rollers 12. Consequently, rollers 12 are held in position, and restrained from falling out to the inside or outside from pockets 11a.

The above-mentioned inner retaining projections 11i and outer retaining projections 11j may be formed by providing two rows of caulking grooves each so as to extend in the circumferential direction in both the inner and outer surfaces of the above-mentioned thick-walled portions 11e. Alternatively, said retaining projections 11i and 11j may also be formed without providing said caulking grooves. However, in the case of providing caulking grooves in this manner, since each retaining projection is formed only by caulking, said roller and cage assembly is suitable for volume production and therefore can be produced inexpensively. In addition, since these caulking grooves also act as so-called oil grooves, efficient lubrication is also achieved.

Figure 14:
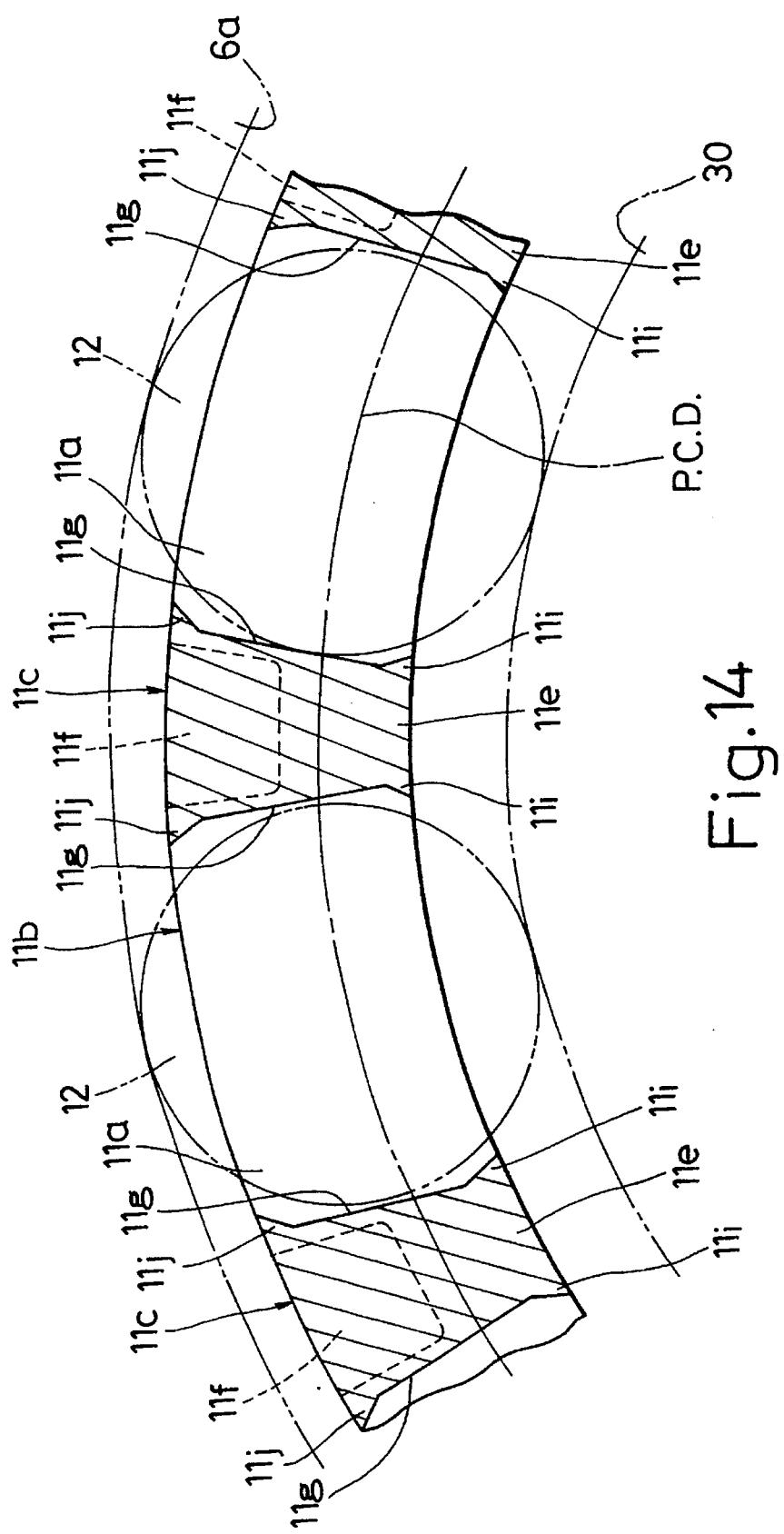
FIG. 14 is a view taken along arrows VII—VII relating to FIG. 10.

FIG. 14 indicates the state of use of said roller and cage assembly after being installed in big end 6a (see FIG. 8) and pin 30 of a connecting rod. In this state of use, rollers 12 make contact with roller guide surfaces 11g formed on both sides of the above-mentioned thick-walled portions 11e, are guided roughly over the pitch circle diameter (P.C.D.) of rollers 12, and their dimensions are set so that they do not make contact with inner and outer retaining projections 11i and 11j. Moreover, dimensions are also set so that the rolling contact surface of big end 6a and the outer periphery of cage 11 make contact before the inner periphery of cage 11 and pin 30 make contact.

Figure 15:
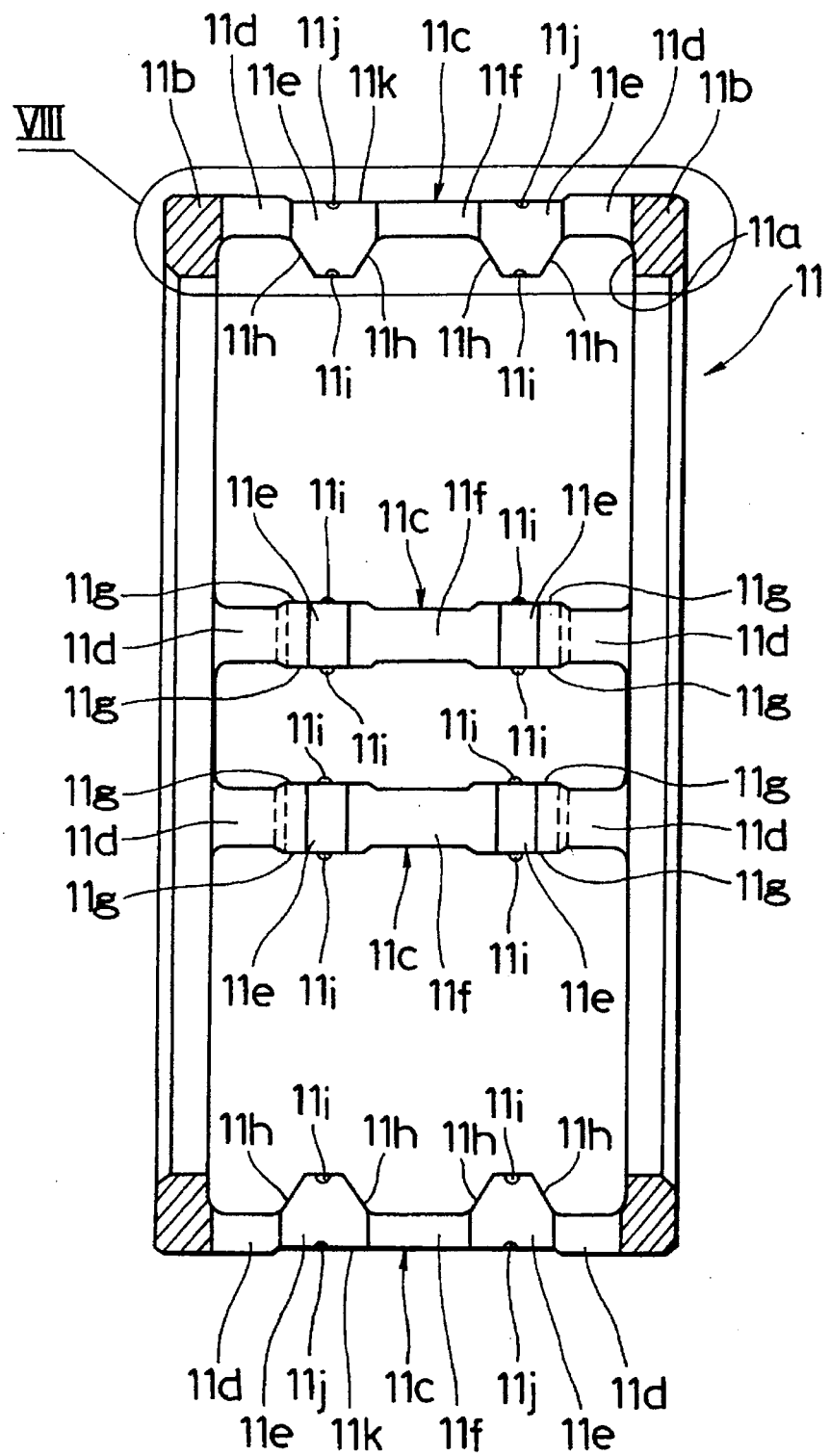
FIG. 15 is a longitudinal cross-sectional view of a roller and cage assembly as a second embodiment of the present invention.
Figure 16:
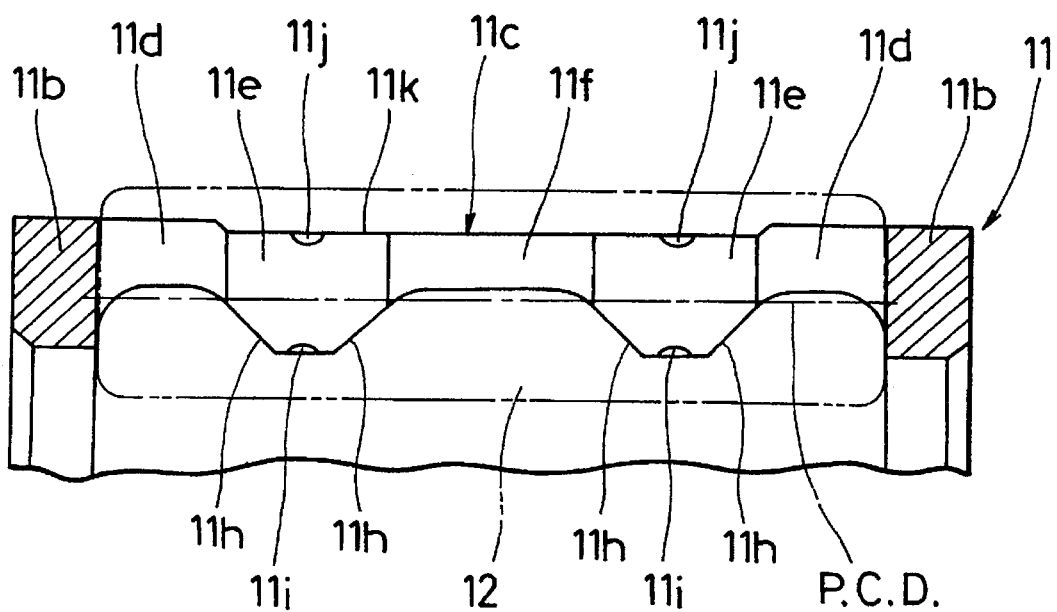
FIG. 16 is an enlarged view of portion VIII in FIG. 15.

Next, the following provides an explanation of a roller and cage assembly as a second embodiment of the present invention using FIGS. 15 and 16. Furthermore, since this roller and cage assembly is composed in the same manner as the roller and cage assembly indicated in FIGS. 10 through 14 as a first embodiment of the present invention with the exception of those portions explained below, an explanation of the entire roller and cage assembly is omitted. Instead, an explanation will only be provided for the essential portion. In addition, in the following explanation, the same reference numerals will be used for those constituents that are identical to constituents of the roller and cage assembly as said first embodiment of the present invention.

As shown in the drawings, in the roller and cage assembly, recess 11k, continuous with pocket 11a, is formed in the outside of column 11c. This recess 11k is relatively shallow, and in the case of the present embodiment, is formed between each of the outside ends of the above-mentioned thick-walled portions 11e provided at two locations of column 11c. Said recess 11k acts as an oil groove. As a result of providing said recess 11k, lubrication characteristics, and particularly formation of an oil film, is improved between the above-mentioned connecting rod big end and said roller and cage assembly.

Figure 8:
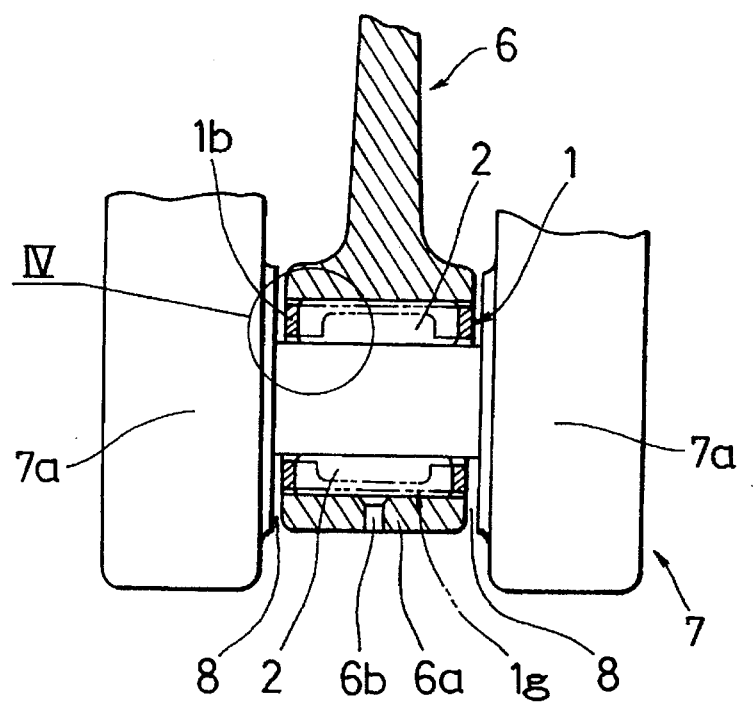
FIG. 8 is a longitudinal cross-sectional view indicating the roller and cage assembly shown in FIGS. 5 through 7 installed on the big end of a connecting rod.
Figure 9:
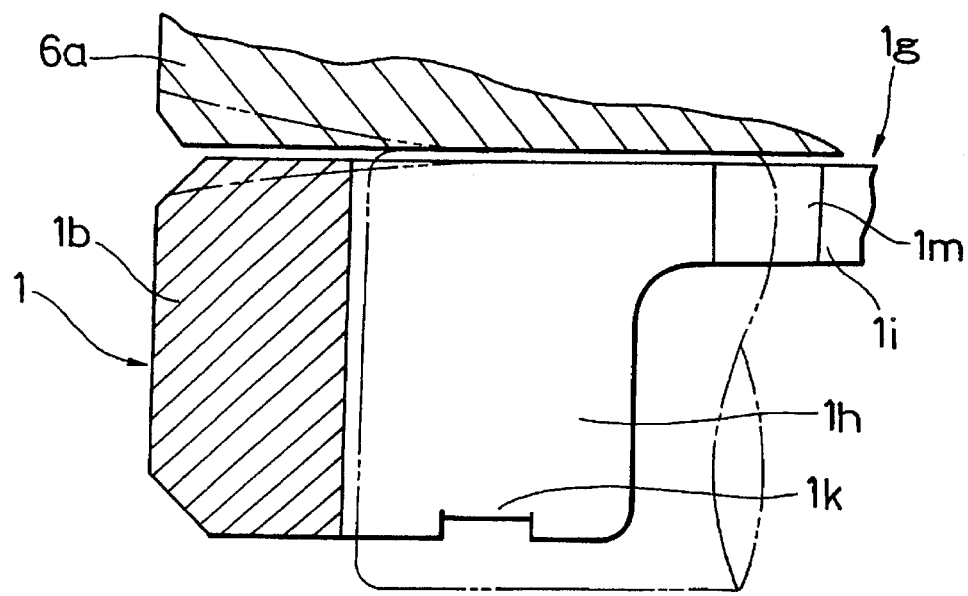
FIG. 9 is an enlarged view of portion IV in FIG. 8.

Furthermore, the range over which the above-mentioned recess 11k is to be formed is not limited to that mentioned above, but rather may, for example, be shortened so as to match the opening diameter of center slit 6b formed in connecting rod big end 6a shown in FIG. 8. As a result of shortening the length of recess 11k in this manner, the contact surface area with respect to the connecting rod big end is increased, thereby suppressing contact pressure to a low level. Preferably, it is thought that by setting the length of the above-mentioned recess 11k to that which is roughly intermediate to this short length and the length indicated in the above-mentioned embodiment, together with achieving rigidity of columns 11c and suppressing contact pressure with respect to the connecting rod big end, the resulting roller and cage assembly also is given adequate lubrication characteristics.

As has been explained above, in the roller and cage assembly according to the present invention, since the cage has high rigidity and the number of rollers incorporated can be increased, the present invention offers the advantage of securing a large load capacity.

In addition, since guide portions in which roller guide surfaces are formed are provided so as to be located near a center slit formed in a connecting rod, lubricant is continuously supplied both adequately and efficiently between the rollers and said roller guide surfaces. Moreover, since there is no imbalance of mass in its axial direction enabling equalization of the mass of the entire cage, contact pressure with the connecting rod is relieved and the localized pV value decreases. As a result of having these characteristics, the present invention also offers the advantage of being able to suppress the generation of heat and so forth even during conditions of low levels of lubrication, thus enabling it to demonstrate favorable high-speed rotation performance.

What is claimed is:

1. A roller and cage assembly comprising:

a roughly cylindrical cage, having rings on both ends;

a plurality of bars arranged in the circumferential direction integrated into a single structure with said rings, which said bars and said rings demarcate pockets; and a plurality of rollers having a diameter larger than a respective wall thickness of said cage which are inserted into each of said pockets parallel to said bars;

wherein, each of said bars is formed so that an outer surface is approximately consistent with a respective outer peripheral surface of said rings over substantially its entire length, wherein each of said bars includes guide portions, in which roller guide surfaces are formed on both sides in the circumferential direction, are provided having a thickness from the outer surface to the inside of a pitch circle diameter of said rollers in the center or its vicinity with respect to an axial direction of said bars, whereby said guide portions are relatively thick-walled with respect to remaining portions of said bars so as to permit weight reduction, wherein separation between adjacent ones of said guide portions is greater than the diameter of respective said rollers and less than the overall pocket width, and wherein only said guide portions of said bars contact the cylindrical surface of said rollers.

2. The roller and cage assembly as set forth in claim 1, wherein said guide portions are provided symmetrically in at least two locations with respect to the center with respect to the axial direction of said bars.

3. The roller and cage assembly as set forth in claim 1, wherein a recess is formed continuously with said pockets in a portion of the outside of said bars.

4. The roller and cage assembly as set forth in claim 1, wherein a portion of said guide portions protrudes so as to face said pockets, thereby defining inner retaining projections and outer retaining portions which restrict said rollers from falling out to the inside or outside.

5. The roller and cage assembly as set forth in claim 1, wherein said rollers are needle rollers.

6. A roller and cage assembly comprising:

a plurality of cylindrical rollers having a predetermined diameter;

a substantially cylindrical cage, comprising:

first and second rings defining ends of said cage, said first and second rings having a predetermined first thickness with respect to a radial direction; and plurality of bars, wherein each of said bars has a predetermined second thickness with respect to said radial direction and wherein each of said bars includes at least one guide portion defining roller guide surfaces formed on both sides of each of said bars in a circumferential direction, said guide portions having a predetermined third thickness with respect to the radial direction;

wherein said first and second rings and said bars, arranged in a circumferential direction, are integrated into a single structure whereby said first and second rings and adjacent ones of said bars demarcate respective pockets;

wherein respective outer surfaces of said bars and respective outer peripheral surfaces of said first and second rings are disposed at substantially similar radii;

wherein said diameter of said rollers is greater than said first thickness;

wherein said second thickness is less than said third thickness;

wherein said third thickness is the radial distance from an inner surface of said guide portion to said outer surface in the circumferential direction passing through the pitch diameter of said rollers; and wherein each of said bars includes a recess in an outer peripheral surface of said cage.

7. The roller and cage assembly as set forth in claim 6, wherein said recess formed is disposed in approximately the center of each of said bars.

* * * * *